Inventor
P. CAROUSSOS
By
Holcombe, Wetherill & Brisebois
Attorneys

Inventor
P. CAROUSSOS
By Holcombe, Wetherill & Brisebois
Attorneys

United States Patent Office 3,460,095
Patented Aug. 5, 1969

3,460,095

METHOD OF USING AN ARITHMETIC CALCULATOR AND CALCULATING MACHINE FOR UTILIZING SAID METHOD

Panayotis Caroussos, Paris, France, assignor to Centre National de la Recherche Scientifique, Paris, France, a French Government administration Filed Feb. 28, 1966, Ser. No. 530,419
Claims priority, application France, Mar. 2, 1965, 7,632
Int. Cl. G11b *13/00;* G06f *1/00*
U.S. Cl. 340—172.5 6 Claims

ABSTRACT OF THE DISCLOSURE

Arithmetic calculator capable of determining for each arithmetic operation whether said operation should be carried out in fixed point or floating point notation, when instructed as to whether absolute or relative accuracy is preferred. The determination made by the machine is dependent on the fact that an operation in fixed point notation is quicker than one in floating point, but in certain cases floating point notation affords greater relative accuracy.

Figure 1:
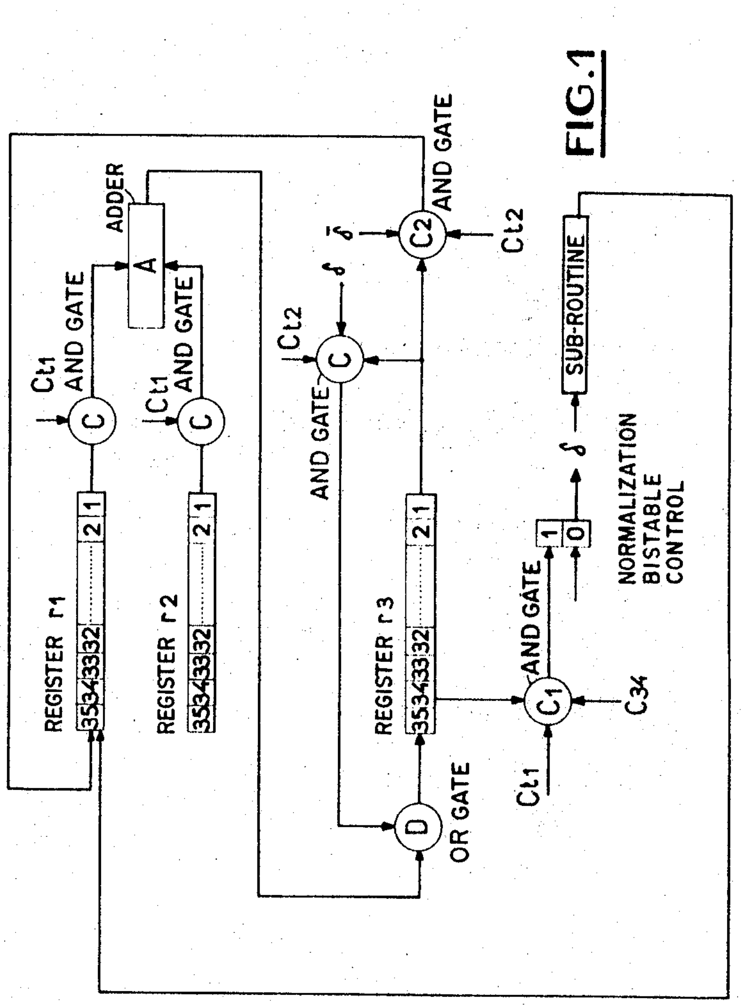

Electronic arithmetic calculators operating on the binary system are presently in use.

However, all the operations of which these machines are capable consist essentially of more or less complex series of algebraic additions and multiplications.

Such calculators may operate with either a fixed or a floating decimal point.

When they operate with a fixed decimal point, the decimal point which appears on a register in binary notation is always located in the same place, regardless of the number and position of the significant figures. It follows that when a fixed decimal point is used all numbers appear with the same absolute accuracy.

When a succession of operations is carried out using a fixed decimal point, the numerals which would appear beyond the right side of the register are automatically eliminated, without having an effect on the absolute accuracy of the result which, as is well known, is independent of the number of digits or numerals appearing at the right of the decimal point on the register.

When in the course of a series of operations with a fixed decimal point the numbers begin to run off beyond the left hand side of the register, the calculation must be stopped, and the number appearing on the register must be "normalized," that is to say, expressed in notation utilizing a floating decimal point.

In this notation, the number A is expressed in the form:

$$A=a2^{\alpha}$$

with "$a$" the mantissa and $\alpha$ the exponent.

In practice, the registers of calculators comprise a certain number of digits allotted to represent the mantissa and another number of digits allotted to represent the exponent.

In the case of the notation utilizing the floating decimal point, the relative accuracy is constant, but the absolute accuracy is not. But it should be noted that in certain cases the relative accuracy of a number expressed using a fixed decimal point may be greater than the relative accuracy achieved with a floating decimal point.

This happens especially when the number of digits in the mantissa is at the time of normalization greater than the number of digits allotted to the mantissa on the register and when the digits which represent a number in fixed decimal point notation represent it exactly (in which case it is not necessary to eliminate significant figures at the right of the register when using a fixed decimal point).

There is a standard procedure for automatically converting into floating point notation on a calculator a number which has already been set up in fixed point notation, and this procedure is herein referred to as "normalization."

Conversely, there is a standard procedure for effecting the inverse transformation from floating point to fixed point notation. Suitable apparatus for effecting such conversions is described in U. S. Patent No. 3,037,701.

In calculators of the type heretofore known, the programmer who determines a priori the successions of operations which must be carried out by the calculator must at each moment determine whether the operation should utilize a fixed or floating decimal point and satisfy himself that all the numbers entering into the same operation are properly expressed in the same notation, that is to say, using a fixed point or a floating point.

In view of the foregoing it will be appreciated that when a succession of operations is carried out using a fixed decimal point, which the same absolute accuracy is preserved, the relative accuracy may diminish considerably if the number represented comprises too few significant figures near the right of the register, and the machine will be automatically stopped if the calculation runs off the left side of the register.

It follows that programmers are always obliged to determine the order of magfnitude of the results obtained after each operation so as to insure that it will not run off the left side of the register and that the accuracy of the result meets the requirements of the calculation.

The consequence of this state of affairs is that in many cases of floating point notation is used for operations which should have been carried out in fixed point notation in order to make maximum use of the capabilities of the machine.

In at least certain types of machines the operations using a fixed decimal point may be carried out very rapidly because they result from a connection, whereas those operations using a floating decimal point require a true calculation, necessitating recourse to the use of a subprogram, which means that it takes about 100 times as long to carry out an operation in floating point notation as it would to carry out the same operation using a fixed decimal point.

Moreover, in certain of the foregoing cases, the fixed decimal point notation is more accurate than the floating point notation.

The present invention is designed to automatically relieve the programmer of the need for determining for each operation whether it should be carried out using a fixed or floating decimal point, and if the numbers entering into the operation are actually of the same notation.

In other words, the invention is designed to render the calculator sufficiently "intelligent" to spontaneously determine for itself at the moment of each operation whether this operation should be carried out in fixed or floating point notation, while taking into account whether the calculation must be carried out with absolute accuracy or a maximum relative accuracy.

The object of the present invention is to provide an arithmetic calculator having in combination the following characteristics:

(1) The "word" representing each number comprises a "bit" the value of which indicates whether the number is expressed in fixed or floating point notation;

(2) It comprises means for automatically normalizing a number supplied in fixed point notation when the bit situated immediately to the left of the bits representing the number indicates the presence of a significant figure which shows a run-off at the edge;

(3) It comprises means for automatically transforming to fixed point notation a number expressed in floating point notation when the value of the exponent indicates that this number may be expressed in fixed point notation;

(4) It comprises means for automatically eliminating numbers extending beyond the right edge of the register;

(5) It may comprise a switch which makes it possible, when only relative accuracy is required, to prevent the device described in numbered paragraph 4 from operating and which brings into action a device which permits a number which extends beyond the right edge to remain in fixed point notation when the number of significant figures remaining on the register is greater than the number of digits devoted to the representation of the mantissa in floating point notation, and which normalizes the number to transform it into floating point notation in the contrary case;

(6) It comprises means consisting, for example, of logic circuits which make it possible to carry out each operation, verify that all the numbers are expressed, in the same notation, and automatically transform into floating point notation all numbers in fixed point notation if such is not the case.

The present invention also relates to a new method of operating an arithmetic calculator characterized by the fact that it verifies before each operation the fact that all the numbers involved in said operation are expressed in the same system of notation and that if such is not in fact the case normalizes all the numbers found to be in fixed point notation, that after an operation carried out on numbers in fixed point notation which results in running off at the left, it automatically normalizes said numbers to obtain a result in floating point notation, and that after an operation carried out in floating point notation it transforms the result into fixed point notation when it may be so expressed.

The machine is adapted to perform arithmetical operations in the fixed point notation because it is faster, because in some cases absolute accuracy is required, and in other cases the relative accuracy resulting from use of the fixed point notation is adequate. It should be remembered that the figures running off at the right have no effect on absolute accuracy which is independent of the number of significant digits appearing at the right of the decimal point on the register. However, relative accuracy *is* affected by the number of significant digits to the right of the decimal point and if there are two few remaining significant digits near the right of the register due to the elimination of figures running off to the right, the relative accuracy will diminish. In the most highly perfected embodiment of the invention the process of achieving a higher relative accuracy when the figures are running off to the right requires a conversion of fixed point notation to floating point notation only when the number of remaining significant digits displayed in fixed point notation is less than or equal to the number of digits allotted to represent the mantissa in floating point notation. Thus, the floating point notation will increase relative accuracy by preserving the significant digits that would have been eliminated in the fixed point notation when running off to the right to the extent of the number of digits allotted to the mantissa. If the remaining significant digits in fixed point notation are greater than the number of digits allotted to the mantissa, then a higher relative accuracy will be achieved in fixed point notation without conversion. The specific structure and method of achieving absolute and relative accuracies follows in the discussion of manual switch B.

In a preferred embodiment of the invention the numbers are expressed in fixed point notation by 32 digits divided into groups of 16 on opposite sides of the decimal point.

In this preferred embodiment of the invention, the numbers in floating point notation are expressed by utilizing 24 digits to represent the mantissa and 8 digits to represent the exponent.

Figure 2:
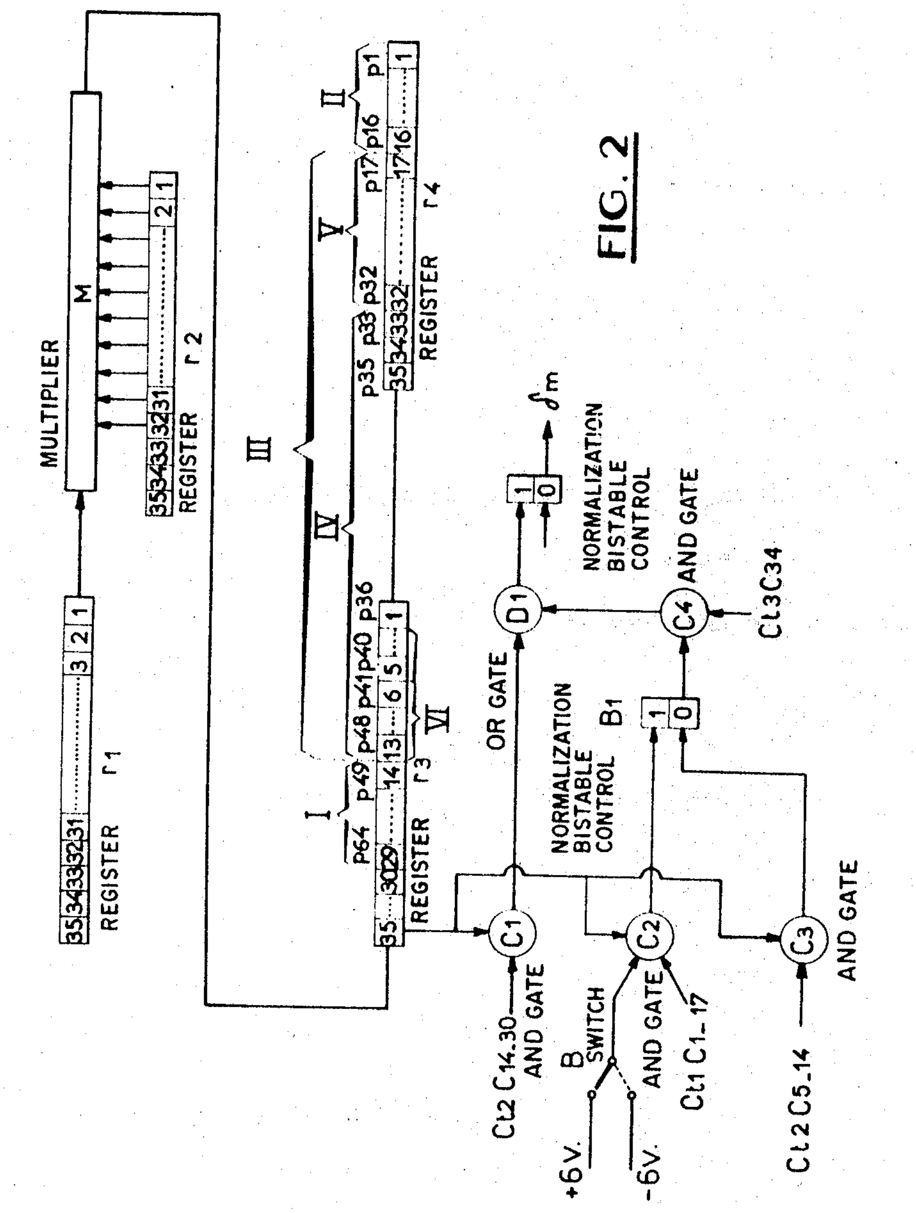

In order that the invention may be better understood, one embodiment thereof will now be described, purely by way of illustration, with reference to the accompanying drawings, in which:

FIG. 1 schematically represents the logic circuit used for performing an addition in accordance with the invention; and FIG. 2 schematically represents a logic circuit for carrying out a multiplying operation in accordance with the invention.

In the embodiment described, a number and the symbols which accompany it are represented by 35 bits ($b_{35}$, $b_{34}$ . . . $b_1$) which make up one word.

In fixed point notation, a number is represented by the 32 bits ($b_1$ to $b_{32}$), with bits $b_1$ to $b_{16}$ representing the fractional part of the number and $b_{17}$ to $b_{32}$ the whole part.

The weights respectively attributed to these 32 bits are $2^{15}, 2^{14} \ldots 2^1, 2^0, 2^{-1}, 2^{-2} \ldots 2^{-16}$, the position of the decimal point of the number being positioned between the bits weighted $2^0$ and $2^{-1}$.

It follows from this notation that the minimal absolute accuracy with which it is possible to write a number in fixed point notation is $2^{-16}$, or about $1.5 \times 10^{-5}$, the maximum capacity of the machine being 65,535.99998. . . .

The three remaining bits are used as follows:

The bit $b_{33}$ is the edge bit. It is equal to 0 if the number has not run off the edge and is equal to 1 if the number has run beyond the edge.

The bit $b_{34}$ is equal to zero if the number is positive and equal to 1 if the number is negative.

The bit $b_{35}$ serves to indicate whether the number is in fixed point or floating point notation, this number being equal to zero if the number is expressed in fixed point and equal to 1 if it is expressed in floating point notation.

In the floating point notation, the mantissa is represented by the 24 bits $b_{32}$ to $b_9$ which have the relative values $2^{-1}, 2^{-2} \ldots 2^{-24}$, while the exponent is represented by the 8 bits $b_8$ to $b_1$, the relative values of which are respectively $2^7, 2^6 \ldots 2^0$.

The relative accuracy is about $5 \times 10^{-8}$ and this notation makes it possible to write in floating point notation numbers ranging from $1.47 \times 10^{-39}$ to $1.70 \times 10^{38}$.

The bits $b_{33}$, $b_{34}$ and $b_{35}$ have the same significances as in the case of the fixed decimal point notation.

The time it takes to shift the contents of a register by one place is called an elementary period. The duration of the first 35 elementary periods is the time required to shift all the contents of a register and is called the "Execution Cycle." A "Minor Cycle" of operation corresponds to 37 elementary periods. Consecutive "Execution Cycles" are therefore spaced by two elementary periods.

The duration of time, in shifting the contents of a register by one place, from elementary period "*i*" to elementary period "*j*," excluding the period "*j*" is identified as "$C_{i-j}$."

An example explaining further the utilization of elementary periods in shifting the contents of a register follows in the discussion on manual switch B.

It will be recalled that "AND" gates C are gates from which a signal is transmitted only when signals are present on all the input lines to that gate.

It will also be recalled that an "OR" gate D is a gate from which a signal is transmitted whenever a signal is present on any of the input lines to that gate.

In the illustrated embodiment, the calculator comprises four registers $r_1$, $r_2$, $r_3$, $r_4$ each having a capacity of 35 digits, each being designated by two indicia, the first of which corresponds to its position in the register and the second of which corresponds to the number of the register.

The calculator according to the invention comprises two logic circuits so connected that when two numbers must be added or multiplied, the calculator tests the bits $b_{35}$ of each number to see that they are all in the same notation. If not, the logic circuits normalize the numbers expressed in fixed decimal point notation and the machine carries out the operation in floating point notation.

FIG. 1 shows how an algebraic addition is carried out, the number $N_1$ which is expressed in fixed point notation appearing on the register $r_1$ being about to be added algebraically to the number $N_2$ appearing in fixed point notation on the register $r_2$.

During the cycle $C_{t1}$ the numbers $N_1$ and $N_2$ are fed individually to the adder A and the result appears in provisional form on the register $r_3$.

Obviously, in the case of addition, the only risk is that the number may run off the register to the left.

When the operation has been carried out and the result appears on the register $r_3$ it is then necessary only to test the bit $b_{33-3}$ to see if there has been such a run-off.

This check is made by means of the AND gate $C_1$, which tests the bit $b_{33-3}$ as it passes to the digidt $d_{34}$ of register $r_3$.

When the bit $b_{33-3}$ is equal to "0," the bistable $\delta$ which controls the normalization remains in state "0" and during the cycle $C_{t2}$ the result is fed via "AND" gate $C_2$ to the register $r_1$ for a new operation.

If, on the contrary, the bit $b_{33-3}$ is equal to "1" the bistable shifts to the state "1" and during the cycle $C_{t2}$ the register $r_3$ feeds back to itself via "AND" gate C instead of returning to register $r_1$ and "OR" gate D for a new operation and the final result in fixed point notation appears on register $r_3$.

At the end of the cycle $C_{t2}$, the bistable $\delta$ interrnpts the principal program and cuts in a sub-routine which normalizes the content of the register $r_3$ and causes it to appear in floating point notation on the register $r_1$, the bit $b_{35}$ having then the value "1". The subroutine conversion to floating point notation has already been elaborated on with respect to the hereinabove stated equation $A=a^{2a}$.

FIG. 2 shows how two numbers expressed in fixed point notation may be multiplied in accordance with the invention. The number $N_1$ appears on the register $r_1$ and $N_2$ on the register $r_2$.

The multiplication is carried out in two cycles of execution $C_{t1}$ and $C_{t2}$ by a series-parallel multiplier M.

The product, which is expressed by a double number of bits ($p_1$ to $p_{64}$) appears on the registers $r_3$ and $r_4$, positioned one beside the other.

During the multiplication the contents of register $r_2$ remains in place while that of register $r_1$ is fed back to itself.

A third cycle $C_{t3}$ is used to take the product of the two numbers $N_1$ and $N_2$, that is to say to take as a final result the 32 bits $p_{17}$ to $p_{48}$ and feed them to the register $r_1$.

It is obvious that this is not always possible.

In the first place, if a bit from group I ($p_{49}$ to $p_{64}$) has the value "1," it is impossible to take the product because it would run off to the left.

The machine then automatically cuts in a sub-routine to transform the numbers $N_1$ and $N_2$ from fixed point to floating point notation and carry out the multiplication in this notation.

The result is then fed to the register $r_1$ and the machine resumes the principal program.

A test to see if the product runs off at the left (by determining whether one of the bits of group I is equal to "1"), is carried out by the AND gate $C_1$ while the product of the multiplier is being transferred to the registers $r_3$ and $r_4$.

During this transfer the bits $p_{49}$ to $p_{64}$ appear successively in the digit $b_{35-3}$ of the elementary period $C_{14}$ at the beginning of the elementary period $C_{30}$ of cycle $C_{t2}$.

It follows that if the value of at least one of the bits of group I is equal to "1," the bistable $\delta m$ passes to the state "1" and at the end of cycle $C_{t2}$ cuts in the sub-routine which normalizes the numbers $N_1$ and $N_2$ and repeats the multiplication in floating point notation.

In order to place the apparatus in position to yield either a given absolute accuracy or a maximum relative accuracy, a manual switch B is employed which makes it possible to supply to the logic circuit of AND gate $C_2$ a bias of +6 volts corresponding to the state "1" or −6 volts corresponding to the state "0."

When the switch B is in "absolute accuracy" position (as shown in broken lines on FIG. 2) the circuit of gate $C_2$ is neutralized in all cases and there is no running off at the left (all the bits of group I being equal to "0"), the bits $p_1$ to $p_{16}$ of group II are ignored and the result is expressed in fixed point notation. The bits $p_{17}$ to $p_{48}$ of group III are under these circumstances fed to the register $r_1$ for a subsequent operation.

It will be noted that the whole part of the product is represented by the bits of group IV ($p_{33}$ to $p_{48}$) whereas the fractional part is represented by the bits of group V (bits $p_{32}$ to $p_{17}$).

Let it now be supposed that the switch B is in the "relative accuracy" position (shown in full lines on FIG. 2) and that the circuit of gate $C_1$ has not passed any bit from group I having the value "1."

During the period $C_{1-17}$ of cycle $C_{t1}$, the circuit of gate $C_2$ tests the bits $p_1$ to $p_{16}$ of the product (group II).

If at least one of the bits of group III is equal to "1" the bistable $B_1$ changes to the state 1 (opposite to that of FIG. 2).

During the period $C_{6-14}$ of the cycle $C_{t2}$, the circuit of gate $C_3$ tests the vxalue bits $p_{40}$ to $p_{48}$ which corresponds to the digits allotted to the exponent (group VI).

If at least one bit from group VI is equal to "1," the bistable $B_1$ is returned to the state "0," which, through the circuit of gate $C_4$, prevents the order $\delta m$ tending to normalize the numbers $N_1$ and $N_2$ so that they may be multiplied in floating point notation from being carried out.

In this case, the product is obtained by eliminating the bits of group II ($p_1$ to $p_{16}$).

On the contrary, if all the bits of group VI have the value "0," the bistable $B_1$ remains in state "1" and the order $\delta m$ which is fed into the circuit of gate $C_4$ transforms the numbers $N_1$ and $N_2$ into floating point notation.

In this case, it is preferable, in order to have a maximum relative accuracy, to avoid elimination of the bits of group II.

Finally it should be noted that when any of the bits of group II is equal to "1," the circuit of gate $C_2$ is neutralized and the solution is obtained directly in all cases in which there is no run-off to the left.

It will be seen that in this embodiment of the calculator according to the invention the calculations are automatically carried out under optimum conditions without intervention by the operator.

The machine shifts automatically to floating decimal point notation only when this is necessary either to prevent running off to the left of the register or to obtain greater relative accuracy.

It will be appreciated that the embodiments which have been described have been given purely by way of example and may be modified as to detail without thereby departing from the basic principles of the invention.

In particular, the bit $b_{35}$ which indicates whether the notation is of the fixed or floating decimal point type, may be eliminated if desired.

In that case, when the notation of the floating point type, the bit $b_{33}$ no longer indicates the edge of the register but ($b_{33}=1$) indicates that the number is in floating point notation. Moreover, in this base, the bit $b_{33}$ may be accorded the value $2^{-1}$ of the mantissa since this value is always present, the mantissa "$a$" being such that $\frac{1}{2}<a<1$.

On the other hand, in fixed point notation, the bit $b_{33}$ always equals 0.

Under these conditions, if during an addition carried out in fixed point notation the bit $b_{33}$ becomes equal to 1, the machine deduces that there is a run off and causes normalization, i.e., a transformation into floating point notation.

It is therefore unnecessary to allot a bit exclusively to the notation.

What is claimed is:

1. In an arithmetic calculator for use with an input in which each word comprises a bit which indicates whether the member expressed by said word is expressed in fixed point or floating point notation, said calculator comprising: a register, means for receiving an input, means connected between said input receiving means and said register for carrying out arithmetic operations on said input, and means for transforming numbers from fixed point notation into floating point notation and vice versa, the improvement which comprises first testing means connected between said input receiving means and said arithmetic operation means for automatically causing said transforming means to transform into floating point notation a number received in fixed point notation whenever the most significant digit of said number indicates that it is too large to appear on said register in fixed point notation, second testing means connected between said input receiving means and said arithmetic operation means for automatically causing said transforming means to transform into fixed point notation a number in floating point notation when the value of its exponent indicates that the number can be expressed in fixed point notation, third testing means connected to test said input after it has passed said first and second testing means but before it reaches said register to determine whether all of the numbers in said input are then expressed in the same notation and causing said transforming means to transform said numbers into floating point notation before they reach said register when such is not the case.

2. In a calculator as claimed in claim 1 comprising means for automatically eliminating from the words in said input bits represents values less than that of the least significant digit which can appear on the register, the improvement which comprises switch and gate means connected to prevent said bit eliminating means from operating and to permit the numbers to remain in fixed point notation so long as the number of significant digits of the number remaining on the register is greater than the number of digits allotted to represent the mantissa when floating point notation is used, but permit said numbers to be transformed into floating point notation when such is not the case.

3. A calculator as claimed in claim 1 comprising means for automatically transforming the multiplier and multiplicand into floating point notation during multiplication whenever the most significant digit of the product cannot be exhibited on the register.

4. The method of operating a calculator comprising a register and adapted to perform arithmetic operations on numbers expressed in terms of words including bits indicative of whether said numbers are expressed in fixed or floating point notation, which method comprising the steps of causing said calculator to verify before each operation whether the words representing all numbers affected by the operation contain identical indicative bits and are therefore expressed in the same system of notation, causing said calculator to transform all of said words originally expressed in fixed point notation into floating point notation when this condition is not met or when the most significant digit of the product is too large to appear on the register, and causing said calculator after each operation in floating point notation to convert the result into fixed point notation whenever said results can be so expressed on the register.

5. The process claimed in claim 4 comprising the step of causing said calculator to eliminate from the calculation those bits having a value less than that of the least significant digit appearing on the register when maximum absolute accuracy is sought, but to retain the numbers in fixed point notation when the number of digits displayed is greater than the number of digits allotted to the representation of the mantissa, while transforming the number into floating point notation when the contrary is the case.

6. In an arithmetic calculator for use with an input in which each word comprises a bit which indicates whether the number expressed by that word is expressed in fixed point or floating point notation, said calculator compirsing: a register, means for normally carrying out arithmetic operations on said input in fixed point notation, but alternatively transforming said words into floating point notation and carrying out arithmetic operations in floating point notation, and means for supplying the result of either operation to said register, the improvement which consists of means for automatically causing said arithmetic operation means to transform said words into floating point notation and carry out its arithmetic operations in floating point notation when, but only when, the most significant digit of at least one of the numbers involved indicates that the result cannot be expressed on the register in fixed point notation.

References Cited

UNITED STATES PATENTS

| | | | |
|---|---|---|---|
| 3,043,509 | 7/1962 | Brown | 235—156 |
| 3,244,864 | 4/1966 | Johes | 235—168 |
| 3,236,999 | 2/1966 | Hertz | 235—164 |
| 3,235,846 | 2/1966 | Okazaki | 340—172.5 |

RAULFE B. ZACHE, Primary Examiner